(12) United States Patent
Michaels et al.

(10) Patent No.: US 8,340,295 B2
(45) Date of Patent: Dec. 25, 2012

(54) HIGH-SPEED CRYPTOGRAPHIC SYSTEM USING CHAOTIC SEQUENCES

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 711 days.

(21) Appl. No.: 12/496,085

(22) Filed: Jul. 1, 2009

(65) Prior Publication Data
US 2011/0002460 A1 Jan. 6, 2011

(51) Int. Cl.
*H04L 9/00* (2006.01)

(52) U.S. Cl. ........ 380/263; 380/255; 380/256; 380/257; 380/258; 380/259; 380/260; 380/261; 380/262; 380/42; 380/43; 380/44; 713/400

(58) Field of Classification Search .............. 380/42–44, 380/255–263; 713/400
See application file for complete search history.

(56) References Cited

U.S. PATENT DOCUMENTS

| | | | |
|---|---|---|---|
| 3,564,223 A | 2/1971 | Harris et al. | |
| 4,095,778 A | 6/1978 | Wing | |
| 4,646,326 A | 2/1987 | Backof, Jr. et al. | |
| 4,703,507 A | 10/1987 | Holden | |
| 4,893,316 A | 1/1990 | Janc et al. | |
| 5,007,087 A | 4/1991 | Bernstein et al. | |
| 5,048,086 A | 9/1991 | Bianco et al. | |
| 5,077,793 A | 12/1991 | Falk et al. | |
| 5,210,770 A | 5/1993 | Rice | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,596,600 A | 1/1997 | Dimos et al. | |
| 5,598,476 A | 1/1997 | LaBarre et al. | |

(Continued)

FOREIGN PATENT DOCUMENTS
EP 0 849 664 A2 6/1998
(Continued)

OTHER PUBLICATIONS

Aparicio; "Communications Systems Based on Chaos" May 2007. Universidad Rey Juan Carlos.

(Continued)

*Primary Examiner* — Edan Orgad
*Assistant Examiner* — Roderick Tolentino
(74) *Attorney, Agent, or Firm* — Fox Rothschild, LLP; Robert J. Sacco

(57) ABSTRACT

A cryptographic system (500) that includes a data stream receiving device (502) configured for receiving a modified data stream representing data entries encrypted using a chaotic sequence of digits. The system also includes user processing device (503, 505) configured for receiving user access information specifying an initial value for the chaotic sequence of digits and data field location information associated with selected ones of the data entries. The system further includes a synchronized pair of chaotic sequence generators (300) coupled to the user processing devices configured for generating encryption and decryption sequences based on the initial value and the data field location information. The system additionally includes an encryption device (504) and a decryption device (506) coupled to the chaotic sequence generators and the data stream receiving device, the decrypter configured for generating an output data stream from the modified data stream by applying the decryption sequences.

20 Claims, 8 Drawing Sheets

U.S. PATENT DOCUMENTS

| | | |
|---|---|---|
| 5,646,997 A | 7/1997 | Barton |
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 | 1/2006 | Liva et al. |
| 6,999,445 B1 | 2/2006 | Dmitriev et al. |
| 7,023,323 B1 | 4/2006 | Nysen |
| 7,027,598 B1 | 4/2006 | Stojancic et al. |
| 7,035,220 B1 | 4/2006 | Simcoe |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,974,146 B2 | 7/2011 | Barkley |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1* | 5/2002 | Di Bernardo et al. ........ 380/263 |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1* | 1/2003 | Lambert .................. 380/263 |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1* | 9/2003 | Johnson et al. .............. 705/76 |
| 2003/0198184 A1 | 10/2003 | Huang et al. |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 | 5/2004 | Hartson et al. |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165681 A1 | 8/2004 | Mohan |
| 2004/0184416 A1 | 9/2004 | Woo |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0072754 A1 | 4/2006 | Hinton et al. |
| 2006/0088081 A1 | 4/2006 | Withington et al. |
| 2006/0093136 A1 | 5/2006 | Zhang et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0239334 A1 | 10/2006 | Kwon et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1 | 8/2007 | Ahmed |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |
| 2008/0075195 A1 | 3/2008 | Pajukoski et al. |
| 2008/0080439 A1 | 4/2008 | Aziz et al. |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0022212 A1 | 1/2009 | Ito et al. |
| 2009/0034727 A1 | 2/2009 | Chester et al. |
| 2009/0044080 A1 | 2/2009 | Michaels et al. |
| 2009/0059882 A1 | 3/2009 | Hwang et al. |
| 2009/0110197 A1 | 4/2009 | Michaels |

| | | | |
|---|---|---|---|
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0285395 A1* | 11/2009 | Hu et al. | 380/263 |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0030832 A1 | 2/2010 | Mellott | |
| 2010/0054225 A1 | 3/2010 | Hadef et al. | |
| 2010/0073210 A1 | 3/2010 | Bardsley et al. | |
| 2010/0111296 A1 | 5/2010 | Brown et al. | |
| 2010/0142593 A1 | 6/2010 | Schmid | |
| 2010/0254430 A1 | 10/2010 | Lee et al. | |
| 2010/0260276 A1 | 10/2010 | Orlik et al. | |
| 2011/0222393 A1 | 9/2011 | Kwak et al. | |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Bererber, S.M., et al., "Design of a CDMA System in FPGA Technology", Vehicular Technology Conference, 2007. VTC2007-Spring. IEEE $65^{TH}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. __ 1-1__1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—A Wolfram Web Resource [online] [retrieved on Nov. 8, 2010] Retrieved from the Internet: <http://mathworld.wolfram.com/surjection.html>.

Weisstein, E., Surejection:, From MathWorld—A Wolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/069121.

Harris Corp., International Search Report mailed Apr. 13, 2010, Application Serial No. PCT/US2009/069118.

Harris Corp., European Search Report mailed Mar. 4, 2010, Patent Application No. 08009745.4.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Taylor, F.J., "Residue Arithmetic a Tutorial with Examples", Computer, vol. 17, No. 5, pp. 50-62, May 1984, doi: 10.1109/MC. 1984. 1659138.

Barda, A; et al., "Chaotic signals for multiple access communications," Electrical and Electronics Engineers in Israel, 1995, Eighteenth Convention of, vol., no., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-26201, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Bender, et al., "Techniques for data hiding", 1995, IBM Systems Journal, vol. 35, pp. 313-336.

* cited by examiner

HIGH-SPEED CRYPTOGRAPHIC SYSTEM USING CHAOTIC SEQUENCES

BACKGROUND OF THE INVENTION

1. Statement of the Technical Field

The invention concerns cryptographic systems. More particularly, the invention concerns a high-speed cryptographic system utilizing digitally generated chaotic sequences.

2. Description of the Related Art

For many types of electronic records, such as medical records, email communications, credit cards records, and customer records, data is generally stored in unencrypted databases. Although numerous linear and non-linear cryptographic algorithms exist, such algorithms are typically not used for database encryption due to the latency issues, processing requirements, and/or security limitations.

In the case of database cryptographic systems using linear algorithms, the non-computation intensive nature of the encryption and decryption processes allow a user to quickly and efficiently decrypt one or more portions of the encrypted database. However, the linear nature of the encryption algorithm (i.e., non-complex) also means that the encryption scheme can be discovered within a reasonable time, allowing third parties access to the encrypted data. As a result, linear encryption algorithms are typically not suited for providing robust security to a determined cryptographer.

In contrast, non-linear encryption algorithms typically rely on a mathematical problem for which no efficient means of obtaining a solution is available and typically provide secure encryption. However, the complex nature of the non-linear algorithm also means that a computation intensive decryption process is typically required to decrypt even the smallest collection of data. More importantly, the nonlinear processes typically fail to permit decryption of an arbitrary portion of the data, requiring decryption of large amounts of data even when only a small portion of the plaintext is required. Accordingly, such algorithms are generally limited to low data rate transfer applications, such as text messaging or particularly high value information.

For example, multiple pseudo-random number generators can generate exceedingly complex pseudo-random sequences for encoding databases. However, such cryptographic systems generally produce complex pseudo-random number sequences that still possess statistical artifacts. Accordingly, such pseudo-random sequences typically require generation of the full sequence in order to decrypt any portion of an encrypted data store. Furthermore, the sequences are typically difficult to unravel and exploit as the mappings become more complex; the encryption process and decryption process are typically asymmetric, placing a computational burden on one side of the process. A desirable cryptographic system for large stores of data will have symmetric computational requirements as well as common processing components. As a result the latency and computing requirements for such encrypted data stores generally becomes prohibitive as the size of the data store is increased.

As a result of the limitations of linear and non-linear encryption algorithms, many data stores are typically retained using little or no amount of encryption. Therefore, there is a need for a high-speed cryptographic system with moderate security for encryption of large stores and transfers of data as present in databases, email, medical records, or internet transfers. There is also a need for such cryptographic systems to have reduced latency and computing requirements when decrypting only a portion of the data. Additionally, there is a desire that the computational requirements and/or components used in encrypting and decrypting the information be relatively symmetric.

SUMMARY

Embodiments of the invention provide systems and methods for high-speed cryptography using chaotic sequences. In a first embodiment of the invention, a cryptographic decryption system is provided. The system includes a data stream receiving device configured for receiving a modified data stream, the modified data stream includes an input data stream representing a plurality of data entries encrypted using a chaotic sequence of digits. The system also includes a user processing device configured for receiving user access information or generating user information from user characteristics, the user access information specifying an initial value for the chaotic sequence of digits and data field location information associated with selected ones of the plurality of data entries. The system further includes a chaotic sequence generator coupled to the user processing device, the chaotic sequence generator configured for generating one or more decryption sequences based on the initial value and the data field location information specified in the user access information. The system additionally includes a decrypter coupled to the chaotic sequence generator and the data stream receiving device, the decrypter configured for generating an output data stream from the modified data stream by applying the decryption sequences to the modified data stream.

In a second embodiment of the invention, a cryptographic encryption system is also provided. The system includes a data stream receiving device configured for receiving an input data stream including a plurality of data entries. The system also includes a user processing device configured for receiving user access information or generating user information from user characteristics, the user access information specifying an initial value for generating a chaotic sequence of digits and data field location information associated with selected ones of the plurality of data entries. The system further includes a chaotic sequence generator coupled to the user processing device, the chaotic sequence generator configured for generating one or more encryption sequences based on the initial value and the data field location information specified in the user access information. The system additionally includes an encrypter coupled to the chaotic sequence generator and the data stream receiving device, the encrypter configured for generating a modified data stream from the input data stream by applying the encryption sequences to the input data stream.

In a third embodiment of the invention, a method for secure communications using a modified data stream is provided. In the method, the modified data stream is based on an input data stream representing a plurality of data entries and a chaotic sequence of digits. The method includes decrypting the modified data at a decryption device, the decrypting including the steps of receiving the modified data stream and receiving user access information, the user access information specifying an initial value for the chaotic sequence of digits and data field location information associated with selected ones of the plurality of data entries. The decrypting also includes generating one or more decryption sequences based on the initial value and the data field location information specified in the received user access information, and utilizing the decryption sequences to the modified data stream to generate an output data stream from the modified data stream. The method can also include the step of encrypting an input data stream, prior to the decrypting of the modified data stream, at an encryption device to produce the modified data stream. This encryption step to produce the modified data stream may optionally be followed by storage of the modified data in a data store, such as a database, for later retrieval or access.

BRIEF DESCRIPTION OF THE DRAWINGS

Embodiments will be described with reference to the following drawing figures, in which like numerals represent like items throughout the figures, and in which.

DETAILED DESCRIPTION

In the various embodiments of the invention, systems and methods are provided for cryptographic systems using a digitally generated chaotic sequence. Such chaos-based cryptographic systems include chaotic encryption systems and chaotic decryption systems that include chaos generators, which are capable of producing a chaotic sequence. In particular, the various embodiments of the invention provide systems and methods in which one or more portions of the chaotically encrypted data are decrypted using a permission-based user key. The user key specifies which records in a database a particular user is allowed to decrypt and how to generate the chaotic sequence for decrypting these records.

The invention will now be described more fully hereinafter with reference to accompanying drawings, in which illustrative embodiments of the invention are shown. This invention may, however, be embodied in many different forms and should not be construed as limited to the embodiments set forth herein. For example, the invention can be embodied as a method, a system, or a computer program product. Accordingly, the invention can take the form as an entirely hardware embodiment, an entirely software embodiment or a hardware/software embodiment.

Generation of Chaotic Sequences

One aspect of the invention provides for a digitally generated chaotic sequence that is used to modify a data stream by increasing its entropy, a process commonly called encryption. In this regard, it should be appreciated that the presence of any discernible pattern in a chaotic sequence is much more difficult to identify as compared to patterns that emerge over time with conventional pseudo-random number sequences. As such, a chaotic sequence is characterized by a greater degree of apparent randomness, more precisely measured as entropy, as compared to these conventional pseudo-random number sequences, providing a higher degree of security. The same digital chaotic sequence used in encryption of data is then capable of decrypting the data, returning it to its prior state.

Figure 1:
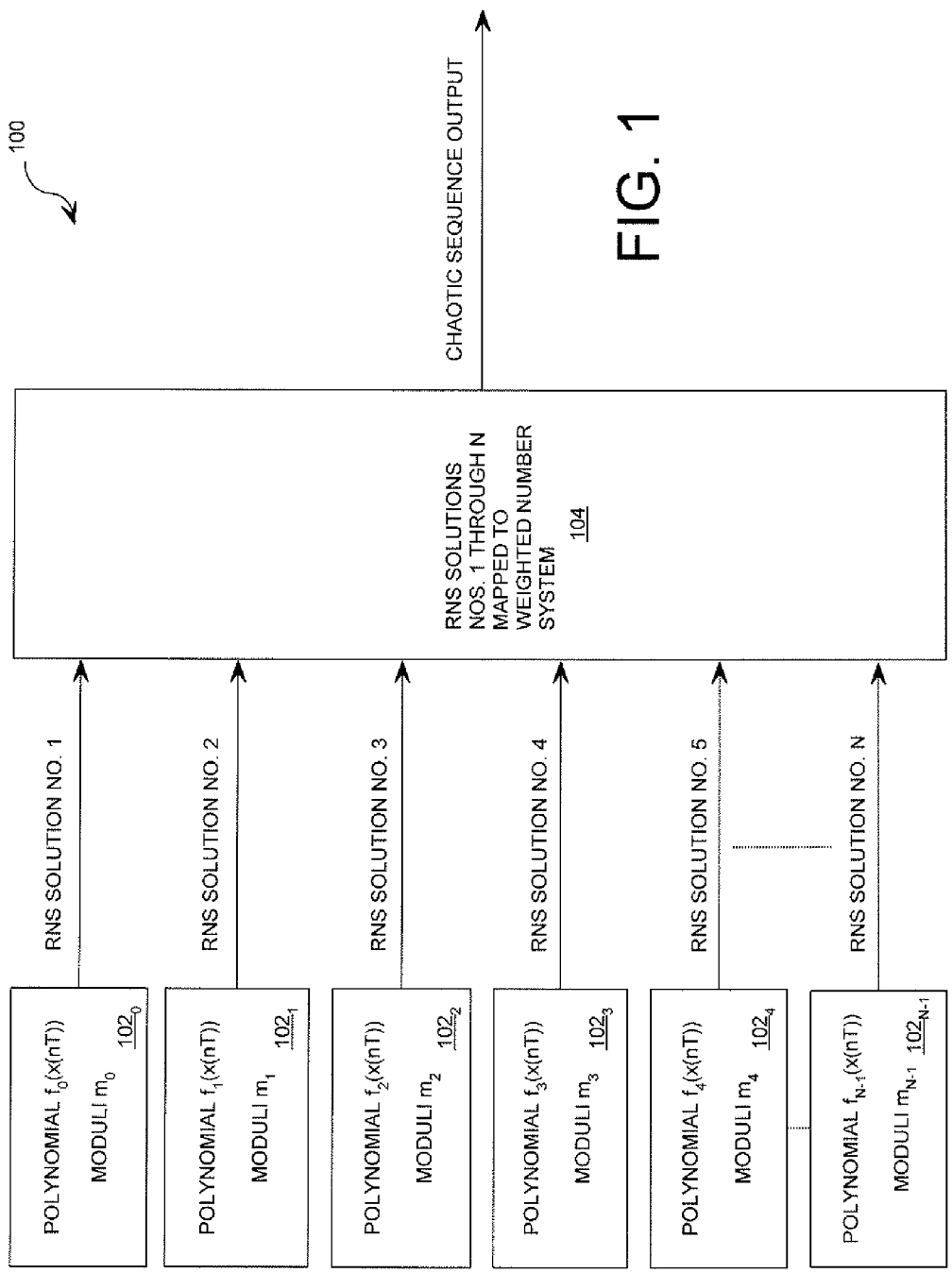
FIG. 1 is a conceptual diagram of a chaotic sequence generator in accordance with an embodiment of the invention.

Referring now to FIG. 1, there is provided a conceptual diagram of a chaotic sequence generator 100 in accordance with the various embodiments of the invention. As shown in FIG. 1, generation of the chaotic sequence begins at a processing devices $102_0, \ldots, 102_{N-1}$ where N polynomial equations $f_0(x(nT)), \ldots, f_{N-1}(x(nT))$ are selected. The N polynomial equations $f_0(x(nT)), \ldots, f_{N-1}(x(nT))$ can be selected as the same polynomial equation or as different polynomial equations. In the various embodiments of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field. For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT))\cdot h(x(nT))$.

As will be understood by one of ordinary skill in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to one of ordinary skill in the art. Thus, such operations will not be described in great detail herein. However, it should be appreciated that a RNS residue representation for some weighted value "a" can be defined by mathematical Equation (1).

$$R=\{a \text{ modulo } m_0, a \text{ modulo } m_1, \ldots, a \text{ modulo } m_{N-1}\} \quad (1)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as an RNS residue value uses a different prime number $P_0, p_1, \ldots, p_{N-1}$ as a moduli $m_0, m_1, \ldots, m_{N-1}$.

Those of ordinary skill in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_0(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT))=Q(k)x^3(nT)+R(k)x^2(nT)+S(k)x(nT)+C(k,L) \quad (2)$$

where n is a sample time index value. k is a polynomial time index value. L is a constant component time index value. T is a fixed constant having a value representing a time increment. Q, R, and S are coefficients that define the polynomial equation $f(x(nT))$. C is a coefficient of $x(nT)$ raised to a zero power and is therefore a constant for each polynomial characteristic. In one embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |

TABLE 1-continued

| Moduli values $m_0, m_1, \ldots, m_{N-1}$: | Sets of constant values $C_0, C_1, \ldots, C_{N-1}$: |
|---|---|
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 1 will depend on the quantity of polynomial equations N and the modulus values $m_0, m_1, \ldots, m_{N-1}$ selected for the RNS number systems. In particular, this value can be calculated as the product $M=m_0 \cdot m_1 \cdot m_3 \cdot m_4 \cdot \ldots \cdot m_{N-2}$.

Referring again to FIG. 1, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (3).

$$BL=\text{Ceiling}[\text{Log } 2(m)] \quad (3)$$

where m is selected as one of moduli $m_0, m_1, \ldots, m_{N-1}$. Ceiling[u] refers to a next highest integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x$ (nT)), ..., $f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of M times T seconds, i.e, a sequence repetition times an interval of time between the computation of each values in the sequence of generated values. Still, the invention is not limited in this regard.

Referring again to FIG. 1, the generation of a chaotic sequence continues with mapping operation performed by a mapping device 104. The mapping operations involve mapping the RNS solutions Nos. 1 through N to a weighted number system representation to form a chaotic sequence output. The phrase "weighted number system" as used herein refers to a number system other than a residue number system. Such weighted number systems include, but are not limited to, an integer number system, a binary number system, an octal number system, and a hexadecimal number system.

In some embodiments of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. In other embodiments of the invention, the RNS solutions Nos. 1 through N are mapped to a weighted number system representation by identifying a number in the weighted number system that is defined by the RNS solutions Nos. 1 through N. According to yet another embodiment of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

In some embodiments of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. [In a mixed-radix number system,] "a number x may be expressed in a mixed-radix form:

$$x = a_N \prod_{i=1}^{N-1} R_i + \ldots + a_3 R_1 R_2 + a_2 R_1 + a_1 \qquad (4)$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed order of decreasing significance." See Id. "The multipliers of the digits $a_i$ are the mixed-radix weights where the weight of $a_i$ is $$\prod_{j=1}^{i-1} R_j \text{ for } i \neq 1." \text{ See Id.} \qquad (5)$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i. \qquad (6)$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1 \qquad (7)$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1 \qquad (8)$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[x = a_N \prod_{i=1}^{N-1} m_i + \ldots + a_3 m_1 m_2 + a_2 m_1 + a_1\right] \quad (9)$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2}, a_3 = \left\langle \left\lfloor \frac{x}{m_1 m_2} \right\rfloor \right\rangle_{m_3} \quad (10)$$

and in general for i>1

$$a_i = \left\langle \left\lfloor \frac{x}{m_1 m_2 \ldots m_{i-1}} \right\rfloor \right\rangle_{m_i} \quad (11)$$

." See Id. From the preceding description it is seen that the mixed-radix conversion process is iterative. The conversion can be modified to yield a truncated result. Still, the invention is not limited in this regard.

In some embodiments of the invention, a Chinese remainder theorem (CRT) arithmetic operation is used to map the RNS solutions Nos. 1 through N to a weighted number system representation. The CRT arithmetic operation can be defined by a mathematical Equation (12).

$$Y(nT) = \quad (12)$$
$$\left\{ \begin{array}{l} \left[\langle (3x_0^2(nT) + 3x_0^2(nT) + x_0(nT) + C_0)b_0 \rangle_{p_0}\right] \frac{M}{p_0} + \ldots + \\ \left[\langle (3x_{N-1}^3(nT) + 3x_{N-1}^2(nT) + x_{N-1}(nT) + C_{N-1})b_{N-1} \rangle_{p_{N-1}}\right] \frac{M}{p_{N-1}} \end{array} \right\}_M$$

where Y(nT) is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime number moduli. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \bmod p_j. \quad (13)$$

The $b_j$'s enable an isomorphic and equal mapping between an RNS N-tuple value representing a weighted number and said weighted number. However without loss of chaotic properties, the mapping need only be unique and isomorphic. As such, a weighted number x can map into a tuple y. The tuple y can map into a weighted number z. The weighted number x is not equal to x as long as all tuples map into unique values for z in a range from zero (0) to M−1. Therefore, in some embodiments of the invention, all $b_j$'s can be set equal to one or more values without practical loss of the chaotic properties. Different values of $b_j$ apply a bijective mapping within the RNS, but do not interfere with the CRT combination process.

The chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by a mathematical Equation (15).

$$MBL = \text{Ceiling}[\text{Log } 2(M)] \quad (15)$$

where M is the product of the relatively prime numbers $p_0, p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. Accordingly, the CRT arithmetic operation generates a chaotic numerical sequence with a periodicity equal to the inverse of the dynamic range M. The dynamic range requires a Ceiling[Log 2(M)] bit precision.

In some embodiments of the invention, M equals three quadrillion five hundred sixty-three trillion seven hundred sixty-two billion one hundred ninety-one million fifty-nine thousand five hundred twenty-three (3,563,762,191,059,523). By substituting the value of M into Equation (6), the bit length (BL) for a chaotic sequence output Y expressed in a binary system representation can be calculated as follows: BL=Ceiling[Log 2(3,563,762,191,059,523)]= 52 bits. As such, the chaotic sequence output Y(nT) is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, the chaotic sequence output Y(nT) can be a binary sequence representing a truncated portion of a value between zero (0) and M−1. In such a scenario, the chaotic sequence output Y(nT) can have a bit length less than Ceiling[Log 2(M)]. It should be noted that while truncation affects the dynamic range of the system it has no effect on the periodicity of a generated sequence.

As one of ordinary skill in art will recognize, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1 \text{ ms}))=3x^3((n-1)\cdot 1 \text{ ms})+3x^2((n-1)\cdot 1 \text{ ms})+x((n-1)\cdot 1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 2:
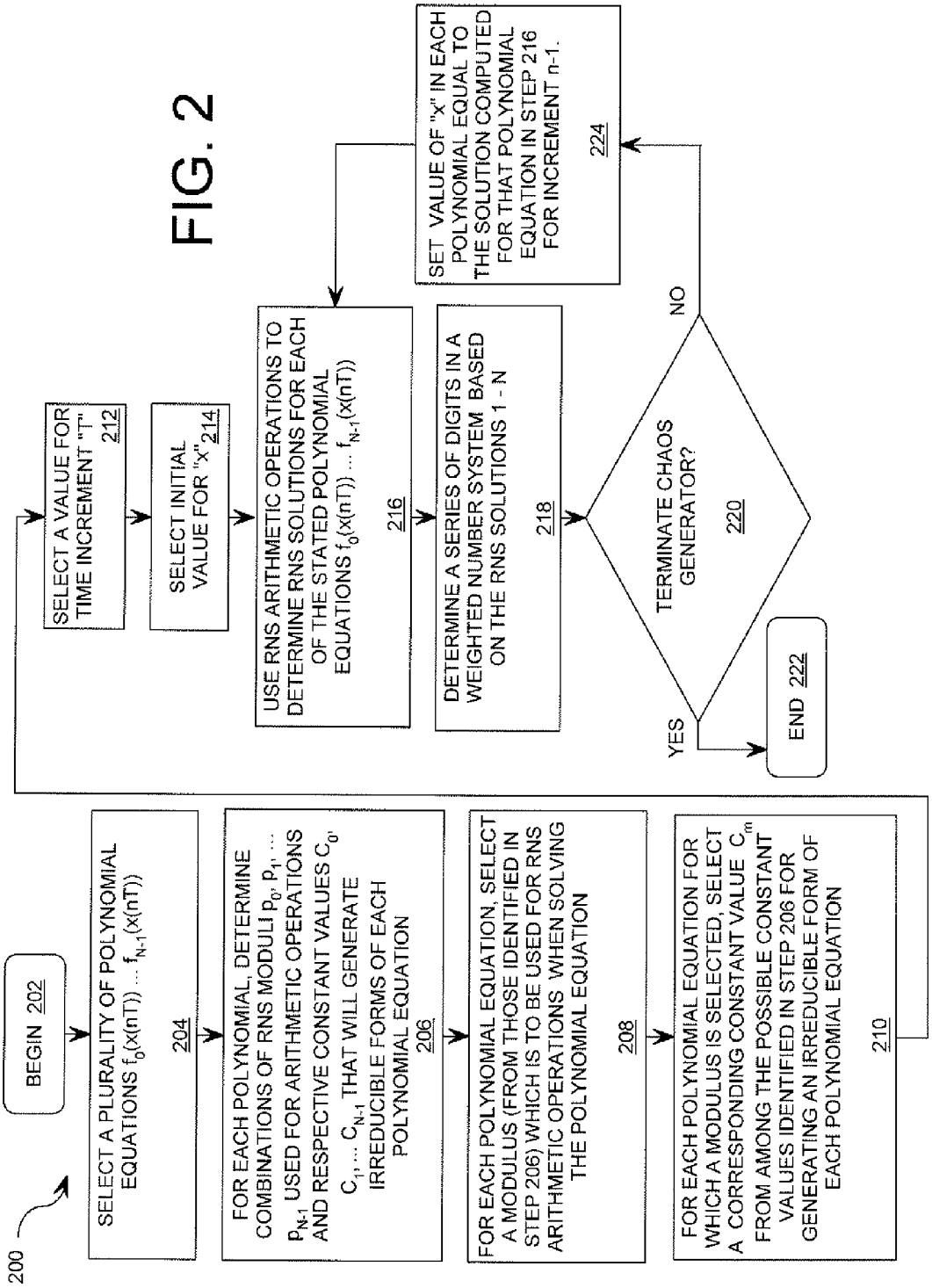
FIG. 2 is a flow diagram of an exemplary method for generating a chaotic sequence in accordance with an embodiment of the invention.

Referring now to FIG. 2, there is provided a flow diagram of an exemplary method 200 for generating a chaotic sequence according to an embodiment of the invention. As shown in FIG. 2, the method 200 begins with step 202 and continues with step 204. In step 204, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 204, step 206 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 208, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 206. It should also be appreciated that a different modulus must be selected for each polynomial equation $f_0(x(nT)), \ldots, f_{N-1}(x(nT))$.

As shown in FIG. 2, the method 200 continues with step 210. In step 210, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 206 for generating an irreducible form of the respective polynomial equation $f_0(x(nT)), \ldots, f_{N-1}(x(nT))$.

After step 210, the method 200 continues with step 212. In step 212, a value for time increment "T" is selected. Thereafter, an initial value for "x" is selected. In this regard, it should be appreciated that the initial value for "x" can be any value allowable in a residue ring. Subsequently, step 216 is performed where RNS arithmetic operations are used to iteratively determine RNS solutions for each of the stated polynomial equations $f_0(x(nT)), \ldots, f_{N-1}(x(nT))$. In step 218, a series of digits in a weighted number system are determined based in the RNS solutions. This step can involve performing a mixed radix arithmetic operation or a CRT arithmetic operation using the RNS solutions to obtain a chaotic sequence output.

After step 218, the method 200 continues with a decision step 220. If a chaos generator is not terminated (220: NO), then step 224 is performed where a value of "x" in each polynomial equation $f_0(x(nT)), \ldots, f_{N-1}(x(nT))$ is set equal to the RNS solution computed for the respective polynomial equation $f_0(x(nT)), f_{N-1}(x(nT))$ in step 216. Subsequently, the method 200 returns to step 216. If the chaos generator is terminated (220: YES), then step 222 is performed where the method 200 ends.

One of ordinary skill in the art will appreciate that the method 200 is only one exemplary method for generating a chaotic sequence. However, the invention is not limited in this regard and any other method for generating a chaotic sequence can be used without limitation.

Figure 3:
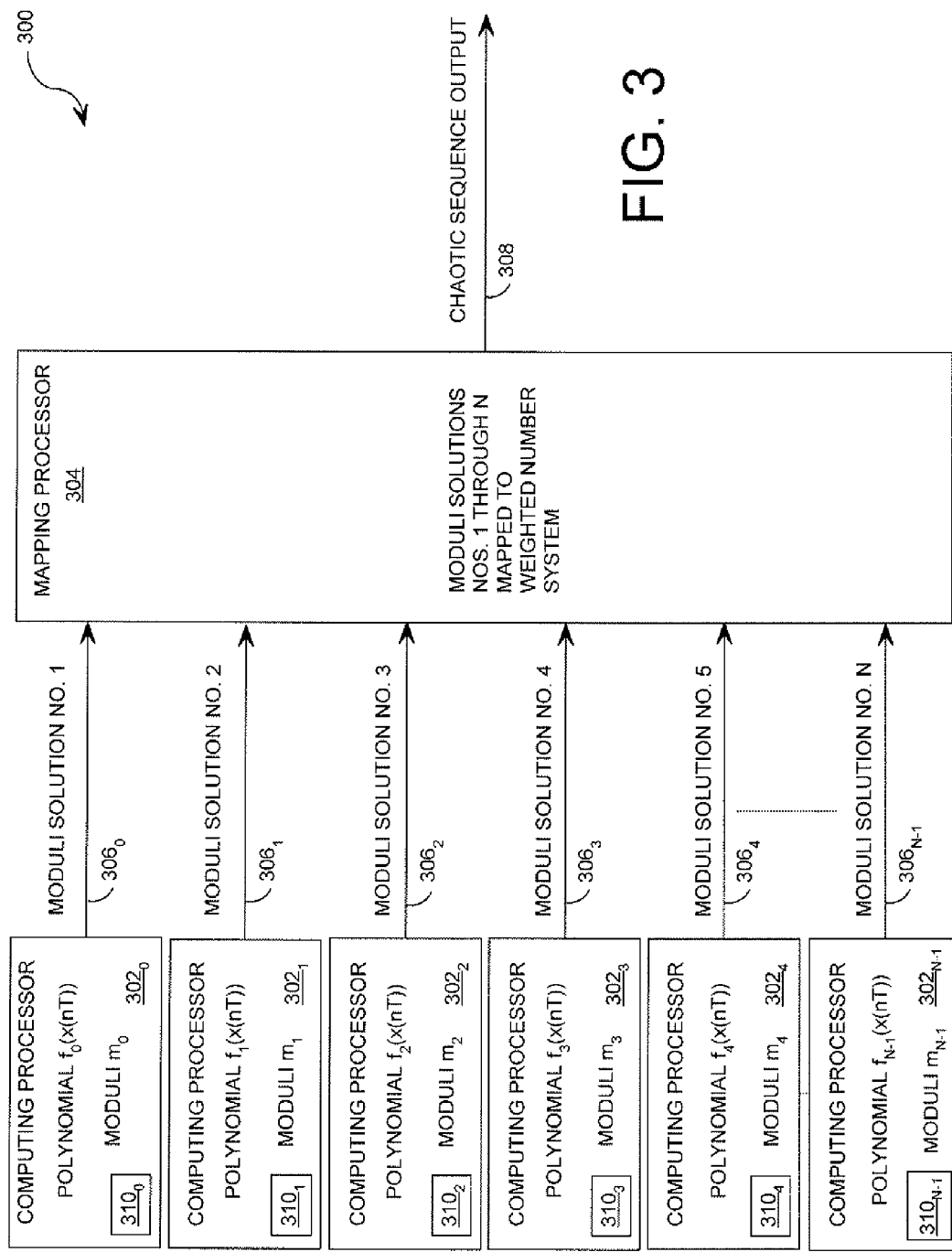
FIG. 3 is a block diagram of an exemplary chaotic sequence generator in accordance with an embodiment of the invention.

Referring now to FIG. 3, there is illustrated an exemplary chaotic sequence generator 300 in accordance with an embodiment of the invention. The chaotic sequence generator 300 is comprised of hardware and/or software configured to generate a digital chaotic sequence. In this regard, it should be appreciated that the chaotic sequence generator 300 is comprised of computing processors $302_0$-$302_{N-1}$. The chaotic sequence generator 300 is also comprised of a mapping processor 304. Each computing processor $302_0$-$302_{N-1}$ is coupled to the mapping processor 304 by a respective data bus $306_0$-$306_{N-1}$. As such, each computing processor $302_0$-$302_{N-1}$ is configured to communicate data to the mapping processor 304 via a respective data bus $306_0$-$306_{N-1}$. The mapping processor 304 can be coupled to an external device (not shown) via a data bus 308. In this regard, it should be appreciated that the external device (not shown) includes, but is not limited to, a cryptographic device configured to combine or modify a signal in accordance with a chaotic sequence output.

Referring again to FIG. 3, the computing processors $302_0$-$302_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $302_0$-$302_{N-1}$ employ modulo operations to calculate a respective solution for each polynomial equation $f_0(x(nT)), \ldots, f_{N-1}(x(nT))$ using modulo based arithmetic operations. Each of the computing processors $302_0$-$302_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $302_0$-$302_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $302_0$-$302_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $310_0$-$310_{N-1}$ are chaotic. In this regard, it should be appreciated that the feedback mechanisms $310_0$-$310_{N-1}$ are provided so that the solutions for each polynomial equation $f_0(x(nT)), \ldots, f_{N-1}(x(nT))$ can be iteratively computed. Accordingly, the feedback mechanisms $310_0$-$310_{N-1}$ are comprised of hardware and/or software configured to selectively define a variable "x" of a polynomial equation as a solution computed in a previous iteration.

Referring again to FIG. 3, the computing processors $302_0$-$302_{N-1}$ are further comprised of hardware and/or software configured to express each of the RNS residue values in a binary number system representation. In this regard, the computing processors $302_0$-$302_{N-1}$ can employ an RNS-to-binary conversion method. Such methods are generally known to one of ordinary skill in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $302_0$-$302_{N-1}$ are further comprised of memory based tables (not shown) containing pre-computed residue values in a binary number system representation. The address space of each memory table is at least from zero (0) to $m_m$ for all m, $m_0$ through $m_{N-1}$. On each iteration, the table address is used to initiate the sequence. Still, the invention is not limited in this regard.

Referring again to FIG. 3, the mapping processor 304 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 304 can be comprised of hardware and/or software configured to determine the series of digits in the weighted number system based on the RNS residue values using a Chinese Remainder Theorem process. In this regard, it will be appreciated by one of ordinary skill in the art that the mapping processor 304 is comprised of hardware and/or software configured to identify a number in the weighted number system that is defined by the moduli solutions Nos. 1 through N.

In the various embodiments of the invention, the mapping processor 304 can be comprised of hardware and/or software configured to identify a truncated portion of a number in the weighted number system that is defined by the moduli solutions Nos. 1 through N. For example, the mapping processor 304 can also be comprised of hardware and/or software configured to select the truncated portion to include any serially arranged set of digits of the number in the weighted number system. Further, the mapping processor 304 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 3, the mapping processor 304 is comprised of hardware and/or software configured to express a chaotic sequence in a binary number system representation. In this regard, it should be appreciated that the mapping processor 304 can employ a weighted-to-binary conversion method. Such methods are generally known to one of ordinary skill in the art and therefore will not be described in great detail herein. However, it should be appreciated that any such method can be used without limitation.

One of ordinary skill in the art will appreciate that the chaotic generator 300 shown in FIG. 3 is an exemplary architecture for a chaotic generator. However, the invention is not limited in this regard and any other chaotic generator architecture can be used without limitation.

High-Speed Cryptography Using Chaotic Sequences

As, previously described, one aspect of the invention is to provide a permission-based user key for decrypting one or more portions of a large collection of data, such as a database, using chaotic encryption without requiring intense computation. A key, as used herein, refers to any piece of information that determines the functional output of a cryptographic algorithm. That is, a key provides information that allows the cryptographic algorithm to generate a resulting encryption data sequence or decryption data sequence used for encrypting or decrypting data. Although the various embodiments of the invention will be described with respect to exemplary key management techniques, transmission methods, and handling precautions, the various embodiments of the invention are not limited in this regard. Any mechanism for allocating and distributing keys to users, in a fashion that ensures distinct users or user groups have distinct keys that are protected from dissemination to unintended users, can be used with the various embodiments of the invention.

Figure 4:
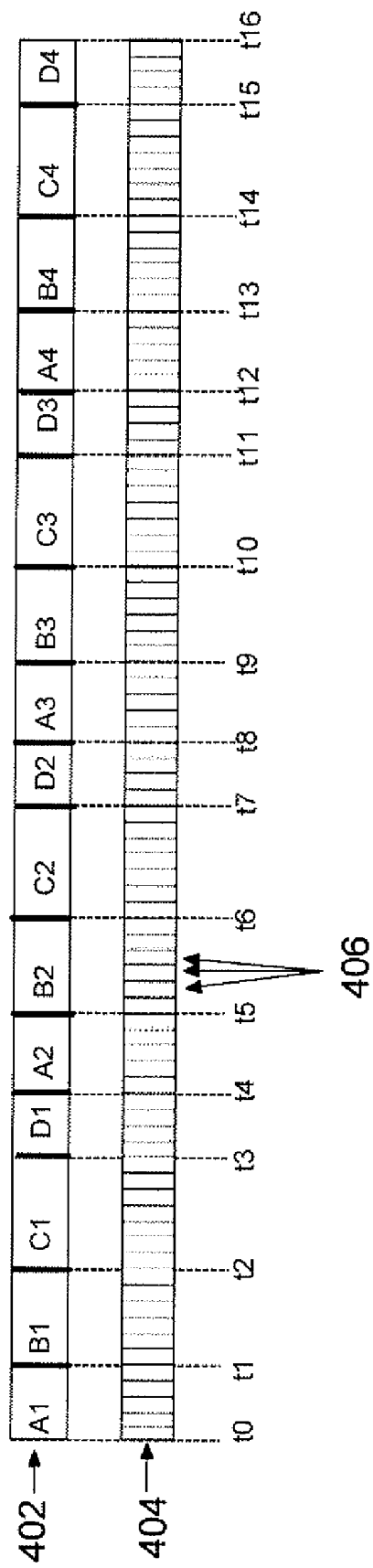
FIG. 4 is a conceptual diagram of the relationship between an exemplary data stream representing a database and an exemplary chaotic sequence generated in accordance with an embodiment of the invention.

FIG. 4 shows a conceptual diagram of the relationship between an exemplary encrypted data stream 402, representing a database, and an exemplary chaotic sequence of digits 404 generated in accordance with an embodiment of the invention. In FIG. 4, the data stream 402 represents a database having a plurality of entries A1-A4, B1-B4, C1-C4, and D1-D4 associated with fields Ax, Bx, Cx, and Dx, respectively. However, the invention is not limited in this regard and any database including any number of entries and/or fields, having the same or variable lengths, can be used with the various embodiments of the invention. As shown in FIG. 4, the data stream 402 can be associated with a chaotic sequence 404, which provided the encryption digits 406 for each bit in the data stream 402. In FIG. 4, each entry is associated with a particular range of digits 406. More precisely, with reference to FIGS. 1-3, each entry is associated with a particular interval of time of the chaotic sequence. For example, entry A1 is associated with the digits 406 generated between t0 and t1. Entry B1 is associated with the digits 406 between t1 and t2. Likewise, the remaining entries C1-D4 are associated in the same manner with digits 406 generated during other time intervals.

Because each of the entries A1-D4 is associated with a particular range of digits 406, the properties of the digital chaos generator, as described above, allow particular ones of entries A1-D4 to be selectively decrypted. That is, if the initial value for the chaotic sequence 404 is provided or calculated from the user key and the time interval associated with the particular ones of the entries A1-D4, the associated digits 406 of the chaotic sequence 404 can be directly calculated and used to selectively decrypt the particular entries. For example, to decrypt the data corresponding to entry A3, the decryption sequence need only calculate the digits 406 corresponding to the time interval between t8 and t9, based on the initial conditions used by the encryption system. In another example, to decrypt all entries for a particular field Dx, the decryption sequence need only calculate the digits 406 corresponding to the time intervals between t3 and t4, t7 and t8, t11 and t12, and t15 and t16, based on the initial conditions used by the encryption system. Thus, decryption of particular entries would not require calculation of the entire sequence, as in most non-linear encryption algorithms, but the chaotic nature of the encryption algorithm provides sufficient security, similar to non-linear cryptosystems.

Figure 6:
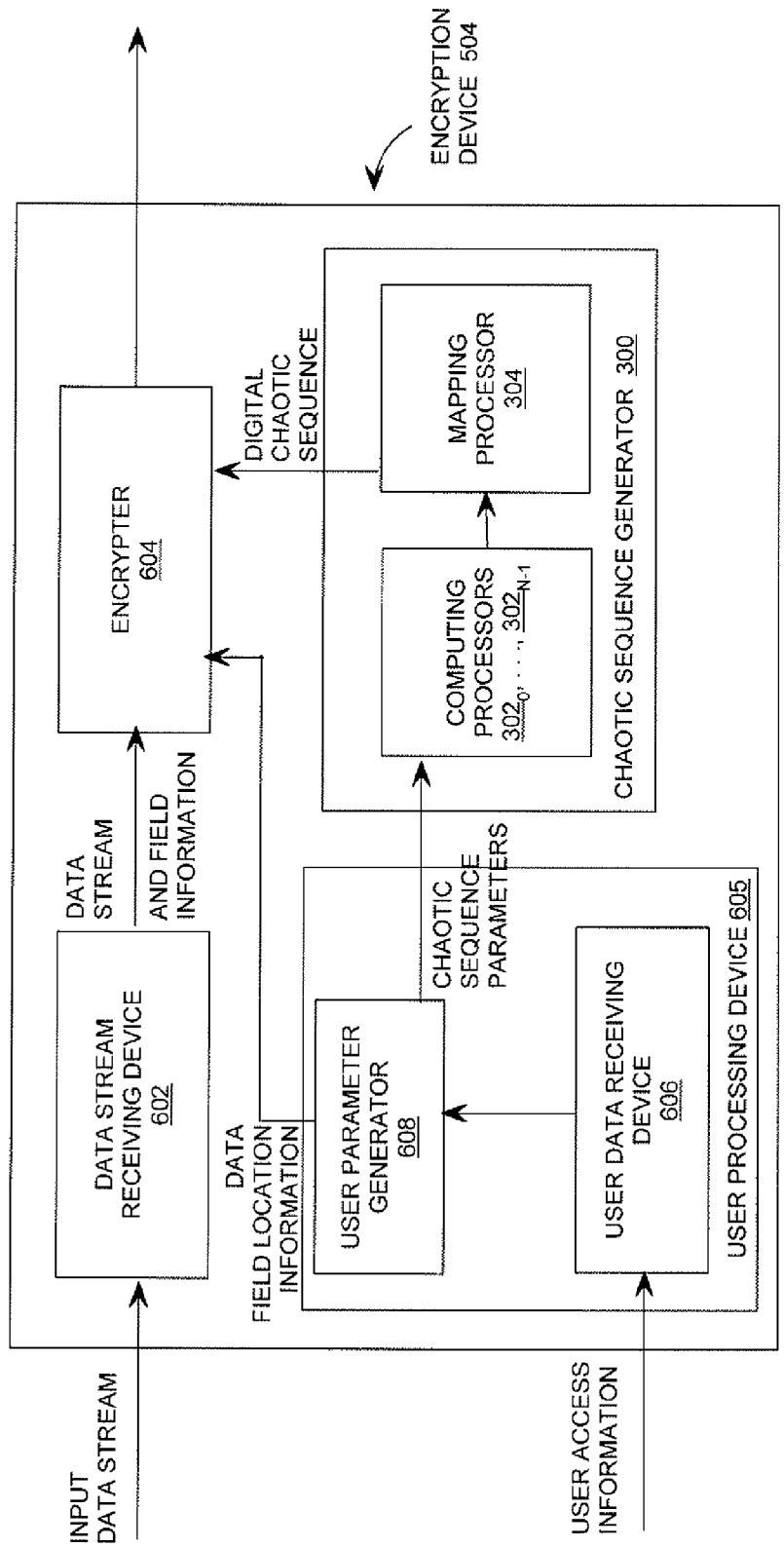
FIG. 6 is a block diagram of the encryption device for FIG. 6 in accordance with an embodiment of the invention.
Figure 7:
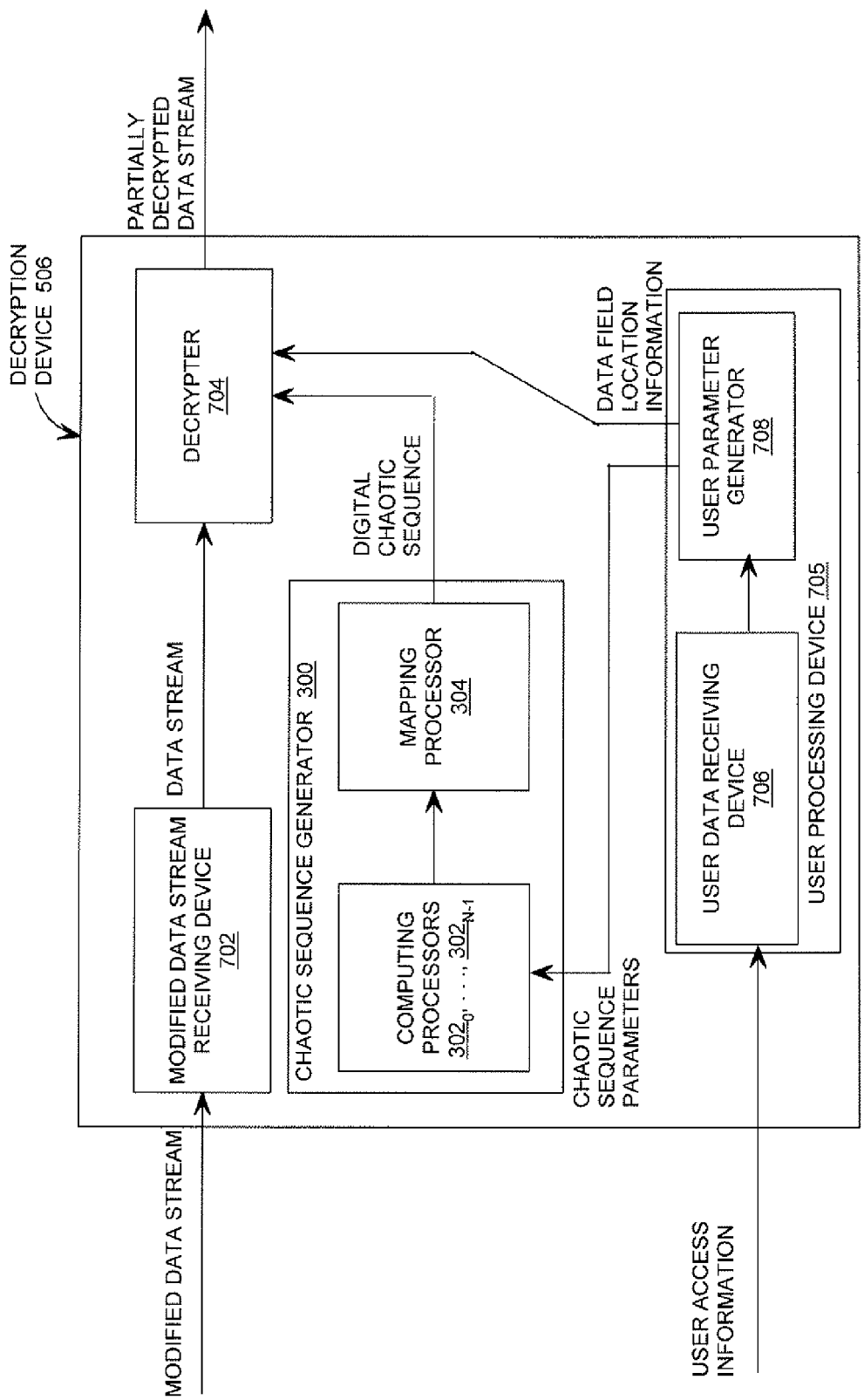
FIG. 7 is a block diagram of the decryption device of FIG. 6 in accordance with an embodiment of the invention.

Accordingly, in the various embodiments of the invention, a cryptographic system can be configured to operate with a user key that provides the necessary information for performing a selective decryption of the encrypted database. Such a user key can be generated prior to encryption of the data and can identify which entries a user is permitted to access. In particular, the generated user key specifies the initial value for the chaotic sequence and the particular portions of the chaotic sequence associated with the particular entries the user is allowed to access. Note that the "key" may consist of multiple subsidiary keys or related algorithm keying parameters as are used to define a distinct cryptonet within the cryptosystem. Such keys can be transmitted using any available secure transmission methods or can have security features to prevent third parties from using the user key. As described previously, any key management mechanism may be used without limitation. Afterwards, during decryption, the decryption system accesses the user key to selectively decrypt the data stream by generating the one or more sequences needed to decrypt the selected portions of the database based on the information specified in the user key. The components and operation of an exemplary system operating with user keys is illustrated in FIGS. 5-7.

Figure 5:
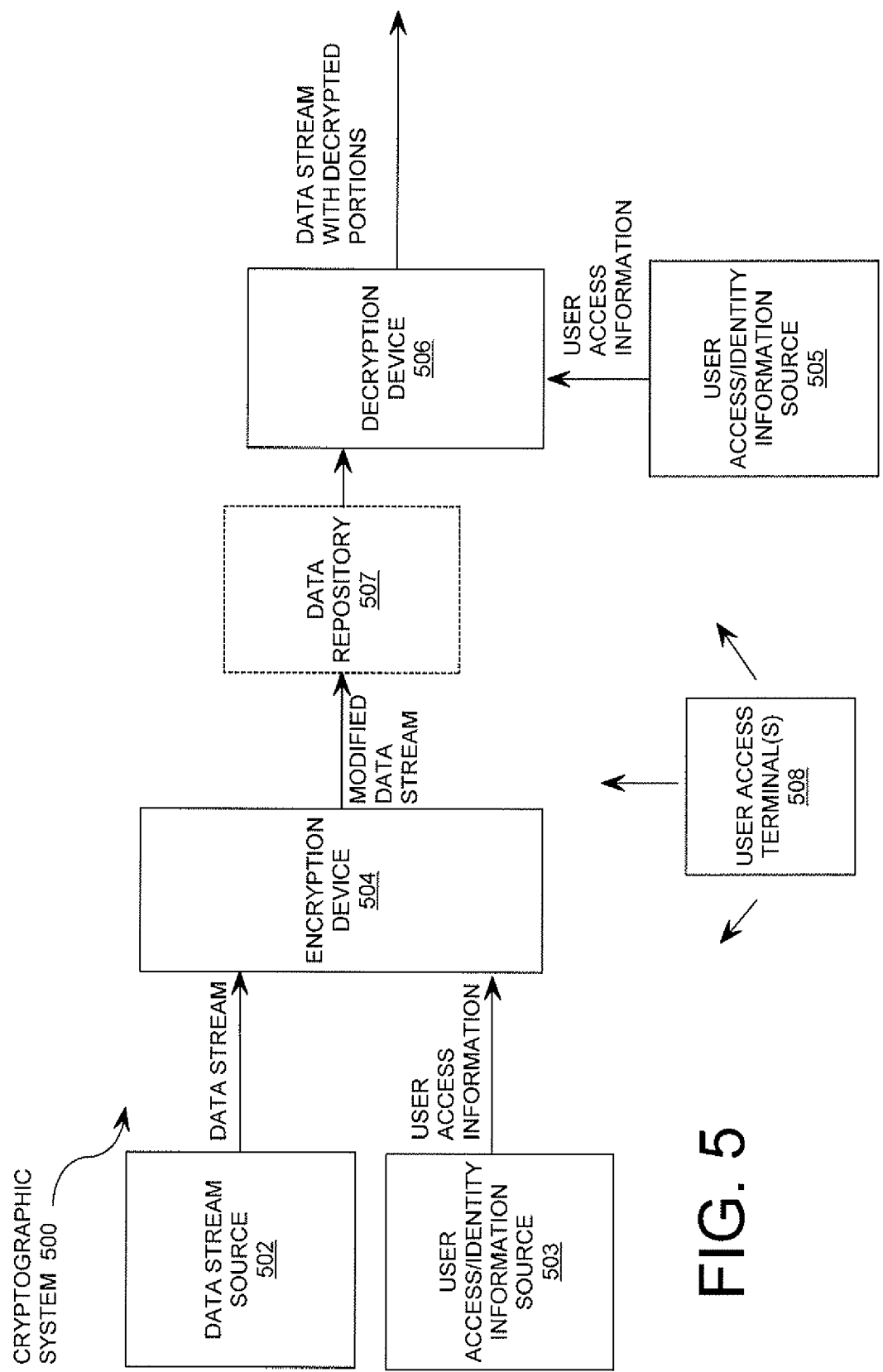
FIG. 5 is a block diagram of an exemplary cryptographic system in accordance with an embodiment of the invention.

Referring now to FIG. 5, there is provided a block diagram of an exemplary cryptographic system 500 in accordance with the various embodiments. Notably, the cryptographic system 500 has an increased security feature as compared to conventional linear cryptographic systems. In this regard, it should be understood that the cryptographic system 500 includes a device to encrypt a data stream utilizing a chaotic sequence. In effect, reverse engineering of mathematical patterns present in an encrypted data stream generated by the cryptographic system 500 is more difficult than reverse engineering of mathematical patterns present in an encrypted data stream generated by a conventional linear cryptographic system due to the absence of cyclostationary features.

Referring again to FIG. 5, the cryptographic system 500 is comprised of a data stream source 502, a user access/identity information source 503, an encryption device 504, a user access/identity information source 505, and a decryption device 506. The data stream source 502 can be comprised of hardware and/or software configured to generate a data stream. The data stream can include payload data, such as voice data, video data, user identification data, signature data and/or the like. The data stream can also be a digital data stream. The data stream source 502 is also comprised of hardware and/or software configured to communicate the data stream to the encryption device 504.

The user access/identity information source 503 can be comprised of hardware and/or software configured to generate data representing a user's access/identity information and permissions. The user data can include any type of user authentication data, such as user code data, user key(s), user signature data, user biometric data, and/or the like. The user access data can also include user access level data, user permission data, and/or any other type of data that specifies which fields of a particular data store that the user is allowed to access. In addition, the user access information may include metadata defining which fields a user wishes to access. In the various embodiments of the invention, such access can be specified directly or indirectly according to a key management/access rules. That is, the user data can identify specific entries the user is allowed to access or the user data can identify categories or properties of entries the user is allowed to access. The generated user data can also be protected from the user in some cases, generating the user access information as used in the encryption device 504, yet without direct access or knowledge of the actual user access information by the user. The user data source 502 is also comprised of hardware and/or software configured to communicate the user data to the encryption device 504.

The encryption device 504 is comprised of hardware and/or software configured to generate an encryption sequence. The encryption sequence is a configurable chaotic sequence. Although the chaotic sequence is a sampled data sequence having a time varying value expressed in a digital form that has no discernable regularity or order, this sequence is configurable based on the combination of user access information provided by the user access/identity information source 503. The encryption device 504 is also comprised of hardware and/or software configured to perform actions to encrypt (or modify) the data stream using the encryption sequence. The encryption device 504 is further comprised of hardware and/or software configured to communicate a modified ciphertext data stream directly to the decryption device 506. However, in some embodiments, the ciphertext data stream can be stored in a database or data repository 507 for decryption and/or access by the user at a later time. The encryption device 504 will be described in greater detail below in relation to FIG. 6.

The decryption device 506 is comprised of hardware and/or software configured to generate one or more decryption sequences for selected portions of the data. The decryption sequences are generated based on the information contained in the user access information generated by the user access/identity information source 505. The description of user access/identity information source 503 is sufficient to understand the operation of user access/identity information source 505. However, it should be noted that the user access information used in the decryption of a set of data is substantially similar to that used in the decryption of the same set of data. The user access/identity information source 505 is configured to provide user access information to the decryption device 506. The decryption device 506 is configured to accept user access information from the user access/identity information source 505. The decryption sequences are configurable chaotic sequences chosen based on the corresponding encryption sequence and encryption method. The chaotic sequences are sampled data sequences having a time varying value expressed in a digital form that has no discernable regularity or order. The decryption sequences can be one or more portions of the encryption sequence generated by the encryption device 504. In some embodiments of the invention, these sequences can be generated at decryption device 506. However, the invention is not limited in this regard. In other embodiments, the decryption sequences can be stored, such as in an external data store or data repository 507. The decryption device 506 is also comprised of hardware and/or software configured to perform actions to interpreting the user access information/keys and extracting information from the user access information/keys. The decryption device 506 is further comprised of hardware and/or software configured to perform actions to decrypt the received modified data stream. The decryption device 506 is also comprised of hardware and/or software configured to communicate the partially or completely decrypted data to an external device (not shown). The decryption device 506 will be described in greater detail below in relation to FIG. 7.

In some embodiments the various components in FIG. 5 can be controlled and/or configured via one or more user access terminals 508, depending on the configuration of system 500. For example, in a system in which encryption and decryption occurs at different physical locations, user access terminals 508 can be provided at the locations of the encryption device and the decryption device. In other embodiments, one or more of the components in FIG. 5 may be incorporated into terminals 508. In still other embodiments, encryption and decryption components can be remotely located and accessed remotely via user access terminal(s) 508.

Referring now to FIG. 6, there is provided an exemplary block diagram, according to an embodiment of the invention, of the encryption device 504 of FIG. 5. As shown in FIG. 6, the encryption device 504 is comprised of a data stream receiving device (DSRD) 602, an encrypter 604, a chaotic sequence generator (CSG) 300, and a user processing device 605. The user processing device 605 can include a user data receiving device (UDRD) 606 and a user parameter generator (UPG) 608.

As shown in FIG. 6, the DSRD 602 is configured to receive an input data stream from an external device, such as the data stream source 502 (described above in relation to FIG. 5). In some embodiments, the input data stream can be received in a format that is ready to be encrypted. In other embodiments the DSRD 602 can be configured to reformat the input data stream into the format required by the encrypter 604. The DSRD 602 is also configured to communicate the input data stream to the encrypter 604.

Referring again to FIG. 6, the UDRD 606 is configured to receive user access information from an external device, such as the user access/identity information source 503 (described above in relation to FIG. 5). In some embodiments, the input data stream can be received in a format that is ready to generate the chaotic sequence parameters for a chosen encryption operation. In other embodiments, the UDRD 606 can be configured to reformat the input data stream into the format required by the UPG 608. The UDRD 606 is also configured to communicate the user access information to the UPG 608. The UPG 608 formats and performs any necessary calculations to translate the provided user access information into chaotic sequence parameters. The UPG 608 is electronically coupled to the chaotic sequence generator 300, providing all chaotic sequence generation parameters needed for synchronized generation of the encryption sequence. The UPG 608 is also configured to communicate data field location information to the encrypter 604, synchronized to the resulting digital chaotic sequence. The combination of chaotic sequence generator parameters and data field location information can be chosen to encrypt a designated set or plurality of subsets of plaintext (as described in relation to fields Dx and associated time intervals in FIG. 5) in the input data stream.

The CSG 300 is configured to receive state synchronization information, key(s), or other user access information from an external device (such as user access/identity information source 503 of FIG. 5). State synchronization information and keys are well known to those skilled in the art, and therefore will not be described in great detail herein. The CSG 300 is also configured to generate an encryption sequence. The encryption sequence is a chaotic sequence having a time varying value expressed in a digital form that has no discernable regularity or order. In this regard, it should be appreciated that the CSG 300 is comprised of a plurality of computing processors $302_0, \ldots, 302_{N-1}$ and a mapping processor 304. The discussion provided above in relation to FIG. 3 is sufficient for understanding the CSG 300.

The CSG 300 is electronically coupled to the encrypter 604. The encrypter 604 is configured to generate a modified data stream by incorporating or combining the encryption sequence with the input data stream. More particularly, the encrypter 604 is configured to perform a combination method for masking one or more portions of the data stream. That is, even though the encrypter 604 can be configured to encrypt the data, as received, in its entirety, one of ordinary skill in the art will recognize that in some cases, only a partial encryption is necessary or desired. For example, it may be desired to only encrypt actual entry data. Such an embodiment can be necessary when the data stream contains both data and database structure information. In particular, the encrypter 604 is configured to receive data field location information from the UPG 608, which is used to synchronize the encryption operations of either a plurality of partial data subsets or the entirety of the data stream received by the encrypter 604 with the associated digital chaotic sequence.

The encrypter 604 can utilize any combination method, including, but not limited to, multiplication within a Galois extension field, addition modulo q, subtraction modulo q, bitwise logic operations, or any other standard combination method. In this regard, it should be appreciated that the encrypter 604 can include a multiplier, an adder, a digital logic device, a feedback mechanism or a similar combining function device. In additional embodiments of the invention, the encryption device 504 may be utilized multiple times to provide multiple levels of encryption with unique keys. The encrypter 604 is configured to provide its encrypted or modified ciphertext data stream to an external device (not shown), such as a data store (e.g. database or hard drive) or a decrypter (such as decryption device 506 discussed in relation to FIG. 5).

A person skilled in the art will appreciate that FIG. 6 only illustrates an exemplary architecture for encryption device 504 in FIG. 5. However, the invention is not limited in this regard and any other encryption device architecture can be used without limitation.

Referring now to FIG. 7, there is provided an exemplary block diagram, according to an embodiment of the invention, of the decryption device 506 of FIG. 5. The decryption device 506 is comprised of a modified data stream receiving device (MDSRD) 702, a chaotic sequence generator (CSG) 300, a decrypter 704, and a user processing device 705. The user processing device 705 can include a user data receiving device (UDRD) 706 and a user parameter generator (UPG) 708.

As shown in FIG. 7, the MDSRD 702 is comprised of hardware and/or software configured to receive a modified data stream from an external device (not shown), such as the encryption device 504 described above in relation to FIGS. 5 and 6 or an external data store (e.g. data repository 507). The MDSRD 702 is also comprised of hardware and/or software configured to communicate the modified data stream to the decrypter 704. In this regard, it should be appreciated that the MDSRD 702 is electronically connected to the decrypter 704.

The UDRD 706 is comprised of hardware and/or software configured to receive user access information from an external device (not shown), such as the encryption device 504 described above in relation to FIGS. 5 and 6. The UDRD 706 is also comprised of hardware and/or software configured to communicate this user access information to the UPG 708. The operation of the UDRD 706 and UPG 708 are substantially similar to the operation of the UDRD 606 and UPG 608 described in relation to FIG. 6, so will not be described in further detail. However, it should be understood that the combined processing of the UDRD 706 and UPG 708 results in generation of synchronized chaotic sequence parameters and data field location information for use by the chaotic sequence generator 300 and the decrypter 704. The UPG 708 is configured to communicate this chaotic sequence parameter information to the chaotic sequence generator 300 and the synchronized data field location information to the decrypter 704. In this regard, it should be appreciated that the UKPD 706 is electronically connected to the CSG 300 and the decrypter 704.

The CSG 300 is configured to receive state synchronization information or a chaotic sequence parameter set from the processed user access information. The CSG 300 is also configured to receive data field location information specified in the user key from the UPG 708. The CSG 300 in decryption device 506 is further configured to generate one or more decryption sequences based on the information within the user key. Accordingly, the CSG 300 only generates the portions of the decryption sequence associated with fields the user is allowed to decrypt. The decryption sequences are generated based on the chaotic encryption sequence and the combination method used in the encryption device 504. The decryption sequences may be chaotic sequences having a time varying value expressed in a digital form that has no discernable regularity or order, where each of the sequences is associated with a particular portion of the modified data stream. In this regard, it should be appreciated that the CSG 300 is comprised of a plurality of computing processors $302_0, \ldots, 302_{N-1}$ and a mapping processor 304. The discussion provided above in relation to FIG. 3 is sufficient for understanding the CSG 300. Furthermore, the discussion of how a chaotic sequence can be generated using an initial value "x" and a time interval "T" in relation to FIG. 2 is sufficient for understanding and how only a portion of the encryption sequence can be generated based on the state information and the data field location information included in the user access information.

The UPG 708 and the CSG 300 are electronically coupled to the decrypter 704. Using the data field location information extracted from the user key by the UPG 708 and the corresponding digital chaotic decryption sequences, the decrypter 704 is configured to decrypt at least a portion of the modified input data stream by performing a decryption method in which the data field decryption sequences are applied to the portions of the modified data stream to be decrypted. Decryption methods are well known to persons skilled in the art, and therefore will not be described in great detail herein. One of ordinary skill in the art will recognize that in some cases, only a partial decryption is necessary or desired. For example, it may be desired to only decrypt actual entry data. Such an embodiment can be necessary when the data stream contains both data and database structure information. In particular, the decrypter 704 is configured to receive data field location information from the UPG 708, which is used to synchronize the decryption operations of either a plurality of partial data subsets or the entirety of the data stream received by the decrypter 704 with the associated digital chaotic sequence.

A person skilled in the art will appreciate that FIG. 7 only illustrates an exemplary architecture for decryption device 506 in FIG. 5. However, the invention is not limited in this regard and any other decryption device architecture can be used without limitation.

Figure 8:
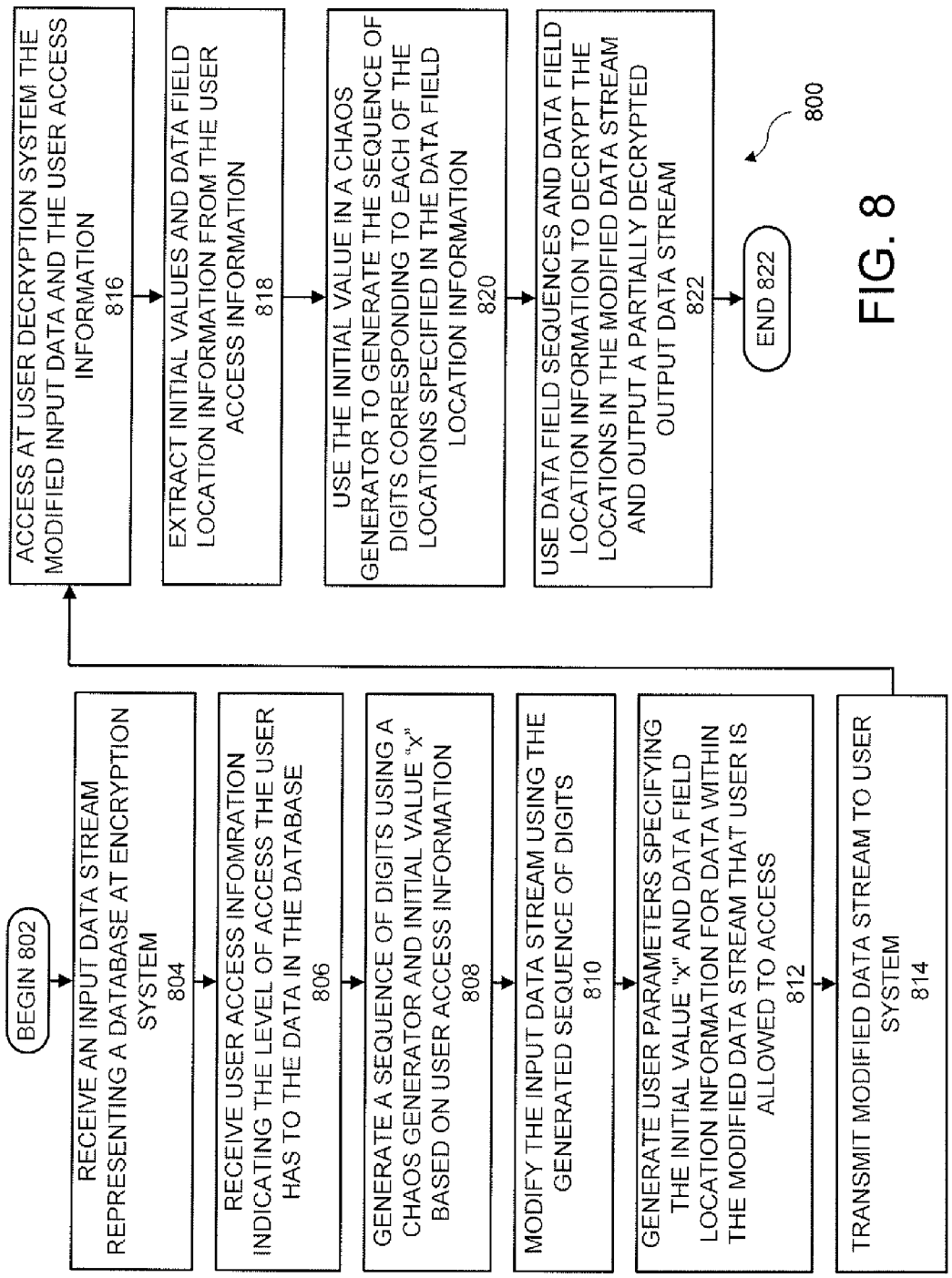
FIG. 8 is a flow diagram of an exemplary method for encrypting and decrypting database information in accordance with an embodiment of the invention.

Referring now to FIG. 8, there is provided a flow diagram of an exemplary method 800 for encrypting and decrypting data, according to an embodiment of the invention. As shown in FIG. 8, the method 800 begins with step 802 and continues with step 804. In some embodiments, the method 800 can be prompted by a user request for information. In other embodiments, the method 800 can be prompted by the owner of the data wishing to send updated versions of a database to users. In step 804, an input data representing a database can be received by the encryption system. In the various embodiments, the data can be received in any form, as previous described with regards to FIG. 6. Subsequently, or in combination with step 804, user data can be received in step 806. As previously described, the user data can include not only user access rights data, but can also include any type of user identification or authentication data. The input data can then be encrypted in steps 808 and 810. First, in step 808, an initial value is used to generate the digit sequence to be used for encrypting the received data. That is, as described in reference to FIG. 2, the initial value "x" is selected and a sequence of digits is generated. Second, in step 810, the sequence generated in step 808 is combined, as previously described, with the input data to produce modified ciphertext data.

Subsequently, or in combination with step 810, method 800 proceeds by assembling at least one user access parameter in step 812. In the various embodiments, the user access parameters are translated into the initial value "x" used for generating the chaotic sequence with user data and data field location information associated with the chaotic sequence, as previously described with respect to FIGS. 5 and 6. However, as previously described, not all data field location information for the modified input database is included into the user access information. Rather, only data field location information for those fields that the user is allowed to access is included in the user access information. In some embodiments, as previously described, additional security features can be added to the user access information to prevent access by unapproved users. The modified data can then be transmitted to a user system in step 814. One of ordinary skill in the art will recognize that a single chaotic sequence can be used to generate user access information for any number of users with differing levels of access. In some embodiments, the user access information is also transmitted at step 814. This information can be transmitted separately to reduce the risk of a security breach.

After the modified data (and the user access information) is transmitted to the user system in step 814, the user decryption system can access the modified data and the user access information in step 816. In some embodiments, the receipt of data can trigger an automatic decryption of the received data. However, in other embodiments, the user decryption system can be configured to await user instructions before proceeding. In such embodiments, the modified data is transmitted to a storage device, such as data repository 507 in FIG. 5. The modified data therefore remains encrypted until the user decryption system receives a command requiring decryption of the modified data. For example, the system can await a command from a user access terminal to access, modify, or retrieve one or more portions of the modified data. Once the modified data and the user access information have been received in step 816, the initial value for creating the decryption sequence and the data field location information can be extracted from the user access information in step 818.

Once the information in the user key has been extracted, the digits of the portions of the chaotic sequence needed for decryption can be generated in step 820. That is, the data field location information is used to identify the portion of the modified input data to be decrypted and the portion of the encryption sequence used to encrypt particular portions of the modified ciphertext data, as previously described. The sequences for these portions can be generated, based on the initial value "x" stored in the user access information and using the data field location information to specify the time interval values "T", as described in reference to FIG. 2. These sequences can then be used in step 822, along with the data field location information to decrypt one or more selected portions of the modified input data. After step 822, method 800 proceeds to step 824, where method 800 ends.

In light of the foregoing description of the invention, it should be recognized that the invention can be realized in hardware, software, or a combination of hardware and software. A method of generating a chaotic sequence according to the invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A cryptographic system, comprising:
   a data stream receiving device configured to receive a modified data stream, said modified data stream comprising an input data stream representing a plurality of data entries encrypted using a chaotic sequence of digits;
   a user processing device configured to receive user access information specifying an initial value for said chaotic sequence of digits and data field location information identifying at least one data field of a plurality of data fields of a database in which a selected one of said plurality of data entries is stored;
   a chaotic sequence generator coupled to said user processing device, said chaotic sequence generator configured to directly generate at least one decryption sequence based on said initial value and said data field location information specified in said user access information, said decryption sequence comprising a replicated portion of said chaotic sequence of digits that was used to encrypt data stored in a respective one of said plurality of data fields of said database; and
   a decrypter coupled to said chaotic sequence generator and said data stream receiving device, said decrypter configured to generate an output data stream from said modified data stream by applying said decryption sequences to said modified data stream.

2. The cryptographic system of claim 1, wherein said chaotic generator generates a plurality of decryption sequences, and wherein said decrypter generates said output data stream by applying said decryption sequences to said modified data stream according to said location information.

3. The cryptographic system of claim 1, wherein said user processing device is further configured to extract said initial value and said data field location information specified in said user access information.

4. The cryptographic system of claim 3, wherein said data field location information which was extracted specifies one or more locations in said modified data stream associated with said selected one of said plurality of data entries.

5. The cryptographic system of claim 4, wherein said data field location information specifies a location of said selected one of said plurality of data entries in said modified data stream and one or more time intervals of said chaotic sequence of digits associated with said selected one of said plurality of data entries in said modified data stream.

6. The cryptographic system of claim 1, further comprising a data repository configured to store said modified data stream and to send the modified data stream to the data stream receiving device upon receipt of at least one command to access at least a portion of the plurality of data entries in said modified data stream.

7. The cryptographic system of claim 6, further comprising at least one user access terminal configured to generate said command.

8. A cryptographic system, comprising:
   a data stream receiving device configured to receive an input data stream comprising a plurality of data entries;
   a user processing device configured to receive user access information specifying an initial value for generating a chaotic sequence of digits and data field location information identifying at least one data field of a plurality of data fields of a database in which a selected one of said plurality of data entries is stored;
   a chaotic sequence generator coupled to said user processing device, said chaotic sequence generator configured to directly generate an encryption sequence based on said initial value and said data field location information specified in said user access information, said encryption sequence comprising a portion of said chaotic sequence of digits selected exclusively for encrypting data to be stored in a respective data field of said plurality of data fields of said database; and
   an encrypter coupled to said chaotic sequence generator and said data stream receiving device, said encrypter configured to generate a modified data stream from said input data stream by applying said encryption sequences to said input data stream.

9. The cryptographic system of claim 8, wherein said chaotic generator generates a plurality of encryption sequences, and wherein said encrypter generates said modified data stream by applying said encryption sequences to said input data stream according to said data field location information.

10. The cryptographic system of claim 8, wherein said user processing device is further configured to extract said initial value and said data field location information specified in said user access information.

11. The cryptographic system of claim 10, wherein said data field location information which was extracted specifies at least one location in said input data stream associated with said selected one of said plurality of data entries.

12. The cryptographic system of claim 11, wherein said data field location information specifies a location of said selected one of said plurality of entries in said input data stream and at least one time interval of said chaotic sequence of digits associated with said selected one of said plurality of entries in said input data stream.

13. The cryptographic system of claim 8, further comprising a data repository configured to store said modified data stream.

14. A method for secure communications using a modified data stream, said modified data stream based on an input data stream representing a plurality of data entries and a chaotic sequence of digits having a time varying value expressed in a digital form that has no discernable regularity or order, the method comprising decrypting said modified data at a decryption device, said decrypting comprising:
   receiving said modified data stream;
   receiving user access information specifying an initial value for said chaotic sequence of digits and data field location information identifying at least one data field of a plurality of data fields of a database in which a selected one of said plurality of data entries is stored;

generating at least one decryption sequence based on said initial value and said data field location information specified in said received user access information, said decryption sequence comprising a replica of said chaotic sequence of digits that was used to encrypt data stored in a respective one of said plurality of data fields of said database; and applying said decryption sequences to said modified data stream to generate an output data stream from said modified data stream.

15. The method of claim 14, wherein said generating further comprises generating a plurality of decryption sequences, and wherein said applying further comprises applying said decryption sequences to said modified data stream according to said data field location information.

16. The method claim 14, prior to said generating, extracting said initial value and said data field location information from said user access information.

17. The method of claim 14, further comprising:
prior to said decrypting of said modified data stream, encrypting an input data stream at an encryption device to produce said modified data stream.

18. A method for secure communications using a modified data stream, said modified data stream based on an input data stream representing a plurality of data entries and a chaotic sequence of digits having a time varying value expressed in a digital form that has no discernable regularity or order, the method comprising decrypting said modified data at a decryption device, said decrypting comprising:

receiving said modified data stream;

receiving user access information, said user access information specifying an initial value for said chaotic sequence of digits and data field location information associated with selected ones of said plurality of data entries;

generating one or more decryption sequences based on said initial value and said data field location information specified in said received user access information;

utilizing said decryption sequences to said modified data stream to generate an output data stream from said modified data stream; and prior to said decrypting of said modified data stream, encrypting an input data stream at an encryption device to produce said modified data stream;

wherein said encrypting further comprising:
generating said chaotic sequence of digits using said initial value;

combining or incorporating said chaotic sequence of digits with said input data stream to generate said modified data stream;

generating data location information for said plurality of entries;

receiving user information specifying said selected ones of said plurality of entries in said modified data stream to associate with said user access information; and assembling said user key, said user parameter generator assembling said user access information utilizing said initial value, said data field location information from said encrypter, and said user information.

19. The method of claim 18, said assembling further comprising:

identifying one or more portions of said data field location information from said encrypter based on said user information;

including said identified portions of said data field location information in said user access information.

20. The method of claim 17, wherein said encrypting further comprises:

storing said modified data stream in a data repository; and sending said modified data stream to said decryption device responsive to receipt of a command to access at least a portion of said plurality of data entries.

* * * * *